Feb. 24, 1959　　H. W. GUNBERG　　2,874,803
LUBRICATION MEANS
Filed July 26, 1955　　2 Sheets-Sheet 2
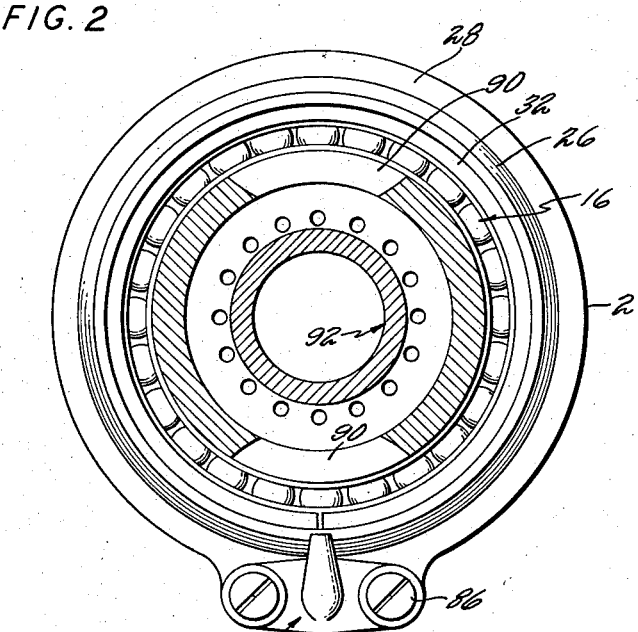
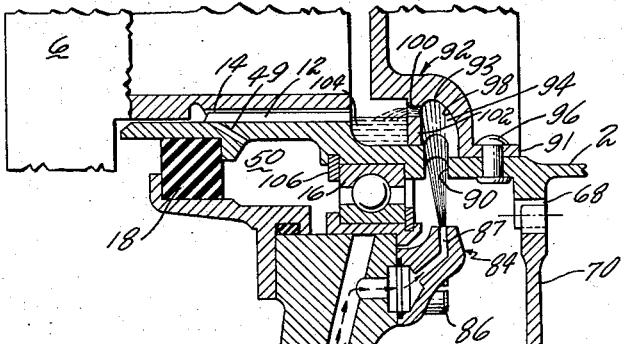
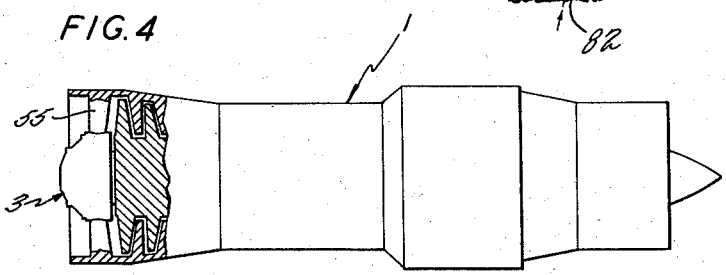
INVENTOR
HARRY W. GUNBERG
BY Vernon F. Hauschild
ATTORNEY

United States Patent Office 2,874,803
Patented Feb. 24, 1959

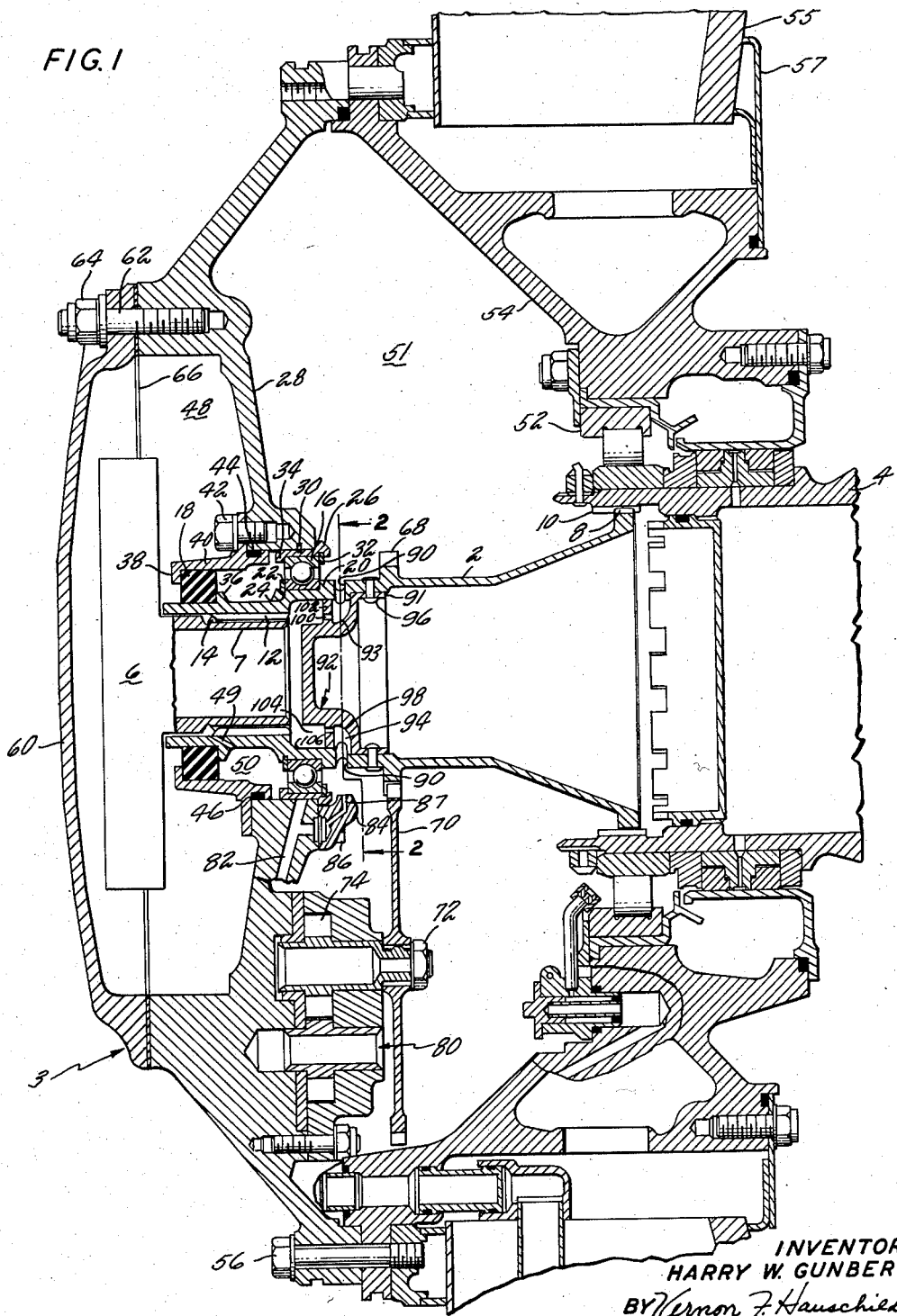

2,874,803

LUBRICATION MEANS

Harry W. Gunberg, West Hartford, Conn., assignor to United Aircraft Corporation, East Hartford, Conn., a corporation of Delaware Application July 26, 1955, Serial No. 524,414

3 Claims. (Cl. 184—6)

This invention relates to lubricating means and more particularly to the lubrication of mechanisms and parts located within hollow rotatable shafts.

It is an object of this invention to provide means external to a hollow rotatable shaft for lubricating mechanisms located within the shaft.

It is a further object of this invention to provide lubricating means which will furnish lubricant to a mechanism located within a hollow rotatable shaft from a reservoir located within the shaft.

It is still a further object of this invention to provide external means for lubricating a mechanism located within a hollow rotatable shaft, which means are simple in construction, light in weight and which do not appreciably affect the strength of said shaft.

In the past, scoops projecting from the interior of shafts have been caused to pass through and be submerged in lubricant within a sump during a portion of each shaft revolution for the purpose of carrying lubricant into the interior of the shaft. This requires sufficient radial space outboard of the shaft to permit scoop projection, and further requires the location of a lubricant sump external of and yet close to said shaft. Further, when this scoop arrangement is used, the effect of centrifugal force may become sufficiently great to overcome the impact force of said scoop intersecting said sump lubricant thereby preventing any lubricant from passing into the interior of the shaft. In current jet engine design, it is not uncommon to have mechanisms located within hollow rotatable shafts which need lubrication. Further, in jet engine "twin spool" design, that is, a jet engine design having dual compressor-turbine combinations which are concentric, lubrication is of primary concern. Applicant shows his invention in connection with a jet engine including the forward end of the compressor or compressor inlet (see Figs. 1 and 4).

My invention overcomes this problem of lubricant injection into a hollow rotatable shaft as it is affected by centrifugal force, in fact, centrifugal force is employed to direct the flow of lubricant to the mechanism or part located within the shaft which is in need of lubricant.

Although, for purposes of description, I choose to show my invention in a particular environment, it is to be understood that this invention has wide application and the claims should not be construed in the light of this disclosure alone.

Other objects and advantages will be apparent from the specification and claims, and from the accompanying drawings which illustrate an embodiment of the invention.

Fig. 1 is a sectional view of the quill shaft connecting an accessory to a drive shaft and showing a preferred embodiment of my lubricating scheme. This particular embodiment is shown as part of a turbine type jet engine.

Fig. 2 is a sectional view taken through line 2—2 of Fig. 1.

Fig. 3 is a partial enlargement of the section shown in Fig. 1.

Fig. 4 is a side elevation of an aircraft jet or turbine engine, partly in section.

Referring to Fig. 1, we see that quill shaft 2 mechanically joins drive or aircraft jet engine compressor shaft 4 and accessory 6 which is driven by accessory drive shaft 7. Quill shaft 2 has exterior male splines or teeth 8 at one end thereof which mate with female splines or teeth 10 of drive shaft 4. Splines 8 and 10 engage loosely to permit flexibility of movement and a reduction in vibration transmission between shafts 2 and 4 and yet provide the necessary positive drive between shafts 2 and 4. The opposite end of shaft 2 is provided with inner diameter spline or teeth 12 which engage mating splines or teeth 14 of the driven shaft 7 which is connected to accessory 6 to cause drive shaft 4 to drive accessory 6 through quill shaft 2. Shaft 2 is supported at one end by bearing 16. Bearing 16 is retained axially on shaft 2 by shoulder 20 and retaining ring 22 which is received in groove 24 of shaft 2. Bearing 16 is supported externally by bearing retaining liner 26 which is supported within housing 28 and retained therein by pin 30. Ring 32 is received in insert 26 to position bearing 16 axially together with lip 34 of insert 26.

Seal 18 prevents lubricant in chamber 50 from flowing forward and is retained on shaft 2 axially by lip 36 which projects from shaft 2 and by lip 38 which projects from seal retaining unit 40. Seal retaining unit 40 is connected to housing 28 by means of a plurality of bolts 42. Sealing unit 44 is received in channel 46 of bearing retaining unit 40 to provide a seal between chambers 48 and 50. Chamber 50 is in communication with chamber 51 through bearing 16. Passage 49 joins chamber 50 with the space between splines or teeth 12 and 14.

Quill shaft 2 is supported at its opposite end by drive shaft 4 which is in turn supported by aircraft engine front compressor bearing 52 which is located within forward aircraft engine compressor housing 54. Housing 54 is connected to engine accessory housing 28 by means of a plurality of bolts 56. Accessory cover pad 60 is connected to housing 28 by means of a plurality of studs 62 and nuts 64 so as to form chamber 48. Gasket 66 may be used between mating faces of housing 28 and cover 60. Housing 54 supports aircraft engine compressor inlet guide vanes 55 through inner shroud 57.

Due to the loose spline or tooth connection between drive shaft 4 and quill or connecting shaft 2, the vibration and eccentricity due to loading of drive shaft 4, is not transmitted to accessory or other driven member 6. This is important if drive shaft 4 is the crankshaft of a piston engine or the compressor shaft of a turbo-jet or turbo-prop engine. If drive shaft 4 represents the compressor shaft of a turbine engine, quill shaft or connecting shaft 2 may be considered to be an accessory drive shaft.

As best shown in Fig. 1, gear 68 projects from shaft 2 and engages gear 70 which is attached positively by means of nut unit 72 to gear unit 74 of oil pump unit 80. It should be understood that gear 68 can be used to drive any accessory or any plurality of accessories.

Further referring to Fig. 1, we see that channel 82 is machined in housing 28 and connected to lubricant nozzle means 84 at one end and to a lubricant pumping source 80 (connection not shown) at its other end. Lubricant nozzle means 84 is connected to housing 28 by any means, possibly a plurality of bolts 86 and has passages 87 therein which are in communication with channel 82 and which are directed and shaped so as to project a stream of lubricant substantially radially inward from said nozzle unit 84 so that said lubricant will strike against the exterior of shaft 2 and pass to the interior of shaft 2 when elongated circumferential slots 90 intercept the path of lubricant flow. Shaft 2 contains at least one circumferential slot 90 and said slot 90 is best shown in Fig. 2. These elongated slots may be machined in shaft 2 by any rotary cutting tool. Of course, hole 90 can be of any desired shape.

As best shown in Fig. 1, circumferentially elongated slots or holes 90 have a circumferential axis lying along line 2—2 which is greater than the slot axial dimension and which lies in a plane substantially perpendicular to the axis of rotation of shaft 2 and lubricant nozzle means 84 lies in substantially the same plane. This slot contour permits lubricant to flow into the interior of shaft 2 during the greatest possible time for a given shaft revolution and holds shaft weakening to a minimum.

As lubricant is projected in a stream or path from lubricant nozzle means 84, it passes through slots 90 as the slots intercept the lubricant stream in the normal rotation of shaft 2. In passing through slots or holes 90, the stream of lubricant strikes against sealing cap or fluid flow directing means 92 and enters cavity 94 located therein. Sealing cap 92 is attached to shaft 2 through cylindrical flange 91 by any convenient mechanical means such as pins 96. Upon entering chamber 94 and outwardly opening annular groove 93, and due to the contour of the wall or inwardly and axially contoured surface 98 of chamber 94, which forms an acute angle with the radially moving lubricant stream, the flow of lubricant is directed to the left and through a plurality of holes 100 which are located in radial flange 102 of sealing cap 92, which flange 102 cooperates with inner surface 98 to form chamber 94 and outwardly opening annular groove 93. This action of the oil impinging against contoured surface 98 of sealing cap 92 and being projected or deflected through holes 100 of said sealing cap 92 is a very rapid action, and due to the velocity force of the lubricant being ejected from nozzle 84, the lubricant enters chamber 94 and is projected or directed through holes 100 with sufficient force that centrifugal force caused by the rotation of shaft 2 and sealing cap 92 is not sufficient to hurl the lubricant radially outward from chamber 94. After passing through holes 100, the lubricant enters inwardly opening annulus or reservoir 104 and because of centrifugal force caused by the rotation of shaft 2 is hurled outwardly against the outer wall 106 of reservoir 104. As sufficient lubricant passes through holes 100, reservoir annulus 104 gradually fills and lubricant is passed between splines 12 of shaft 2 and splines 14 of accessory 6 to provide a lubricating function between these parts. After being passed between splines 12 and 14, the lubricant will be passed to scavenge through drain holes 49 in shaft 2 thru chamber 50 which will be connected by appropriate passages (not shown) to a scavenge sump (not shown).

Applicant has described sealing cap 92, annular chamber 104 and other related equipment to demonstrate or teach one method of conducting lubricant to a mechanism located within a shaft. Of course, other structural arrangements could have been used and the structural arrangement need be designed to solve the particular lubricant conveying problems, depending upon the position of the mechanism being lubricated relative to the shaft holes. Of course, if the shaft holes 90 can be placed in approximately the same radial plane as the mechanism within the hollow shaft in need of lubrication, the lubricant will strike the mechanism directly after passing thru shaft holes 90 and no lubricant conveying means will be necessary. In all mechanical arrangements, it is not possible to either locate the mechanism in need of lubrication or the lubricant supply in the desired arrangement.

Further, it will be obvious to one skilled in the art that the lubricating oil which has been used to lubricate something within the shaft can be used to lubricate objects, such as bearing 16, external of the shaft thereafter.

It is to be understood that the invention is not limited to the specific embodiment herein illustrated and described, but may be used in other ways without departure from its spirit as defined by the following claims.

I claim:

1. A hollow rotatable shaft, at least one elongated circumferential hole extending through the wall of said shaft and having a circumferential axis which lies in a plane substantially perpendicular to the axis of said shaft, fluid flow directing means located within said shaft and positioned inboard of said elongated shaft hole, lubricant nozzle means located external to said shaft and positioned to direct a stream of lubricant at said shaft so that said shaft hole will intercept said lubricant stream such that lubricant is transmitted into said shaft during rotation of said shaft, said fluid flow directing means comprising a cap-like unit having an outer periphery in the form of a cylindrical flange which snugly engages the inner diameter of said shaft in sealed relation and projects inwardly therefrom to provide an inwardly and axially directed contoured surface located radially inward from said hole and having a radial flange projecting from the inner end of said contoured surface to form an outwardly opening annular groove therewith and extending outwardly to engage the inner diameter of said shaft in sealed relation, said radial flange having at least one hole at its inner end through which lubricant may flow, an inwardly opening annular groove formed by one side of said radial flange and the inner wall of said shaft such that the lubricant projected by said nozzle means will pass through said elongated hole and be directed through said flange hole by said contoured surface and collected in said inwardly opening annular groove for overflow distribution to internal lubrication points.

2. A hollow rotatable shaft of substantially circular cross-section adapted to rotate at high speeds and having an axis and having at least one elongated circumferentially extending slot passing through its wall with a circumferential axis lying in a plane substantially perpendicular to the axis of said shaft, contoured means located within said shaft and positioned radially inward of said slot and presenting a surface defining an acute angle with said plane, and stationary lubricant nozzle means external to said shaft located substantially in said plane and positioned and shaped to direct a high velocity, radially extending stream of lubricant into said shaft throughout the full circumferential dimension of said hole as said hole rotates past said nozzle means to impinge against said contoured means surface and be deflected rapidly therefrom in a substantially axial direction.

3. A hollow rotatable shaft of substantially circular cross-section and having an axis and further having a plurality of slot-shaped holes extending through the wall of said shaft and being equally spaced circumferentially thereabout and having an elongated circumferential axis which lies in a plane substantially perpendicular to the axis of said shaft and which is large with respect to the axial dimension of said hole, means to drive said shaft at high speeds, fluid flow directing means located within said shaft and positioned inboard of said elongated shaft holes and having a contoured surface, stationary lubricant nozzle means located radially external to said shaft and positioned and shaped to direct a high velocity radially extending stream of lubricant at said shaft so that each of said shaft holes will intercept said lubricant stream throughout said full circumferential axis thereof so that lubricant is transmitted into said shaft as said holes pass thru said stream of lubricant, said contoured surface of said fluid flow directing means defining an acute angle with said radially extending stream of lubricant and located radially inboard of said shaft holes to intercept and deflect said lubricant stream passing through said holes to change the direction of the lubricant stream flow from substantially radial to substantially axial, and inwardly opening annular lubricant reservoir means located on the interior surface of said shaft adjacent said contoured surface and positioned to receive the lubricant deflected by said contoured surface to be accumulated therein by centrifugal force for overflow distribution to lubricant areas within the shaft interior.

References Cited in the file of this patent

UNITED STATES PATENTS

| | | |
|---|---|---|
| 2,655,014 | Walker | Oct. 13, 1953 |
| 2,693,248 | Gaubatz | Nov. 2, 1954 |
| 2,712,967 | Sutton | July 12, 1955 |

FOREIGN PATENTS

| | | |
|---|---|---|
| 417,465 | Germany | Aug. 11, 1925 |
| 610,010 | Great Britain | Oct. 11, 1948 |
| 624,970 | Great Britain | June 20, 1949 |